March 9, 1937.  B. NOYES, JR  2,073,395
THERMOMETER
Filed April 23, 1936

INVENTOR
BRADFORD NOYES JR.
BY D. Clyde Jones
ATTORNEY

Patented Mar. 9, 1937

2,073,395

UNITED STATES PATENT OFFICE 2,073,395

THERMOMETER

Bradford Noyes, Jr., Rochester, N. Y., assignor to Taylor Instrument Companies, Rochester, N. Y., a corporation of New York Application April 23, 1936, Serial No. 75,980

3 Claims. (Cl. 73—52)

This invention relates to thermometers.

One of the primary requisites of a thermometer is that the height of its indicating column should be readily distinguishable. The main feature of the present invention, therefore, relates to a thermometer having a glass capillary tube or stem portion of such cross section that the indicating liquid appears to be coextensive with the face of the tube.

Figure 1:
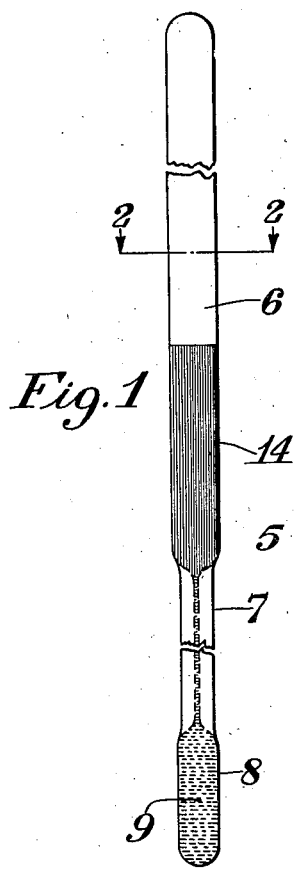
Figure 2:
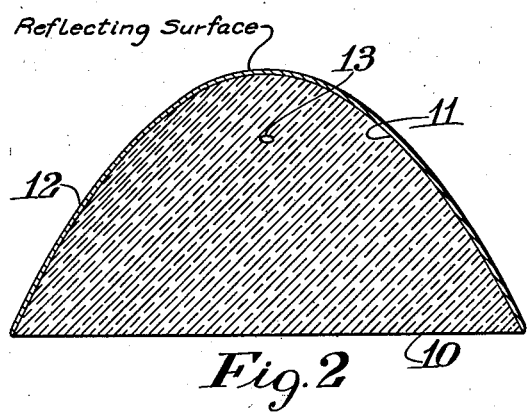

For a clearer understanding of the invention reference is made to the drawing in which Fig. 1 is a fragmentary front elevation of a thermometer made in accordance with the present invention; Fig. 2 is an enlarged cross section of this thermometer taken substantially on the line 2—2 of Fig. 1; and Fig. 3 is a similar cross section of a slightly modified type of thermometer.

In the drawing the numeral 5 generally designates a thermometer having an upper or indicating capillary tube section 6 of glass, sealed at its upper end and joined at its lower end to a connecting capillary tube section 7, also of glass, with the bores of the two sections communicating with each other. The lower end of the section 7 communicates with a well-known bulb 8. The bulb and a portion of the tube section contain an indicating medium such as mercury, or colored spirits, the colored spirits being preferred because of their greater legibility. The front or reading face 10 of the section 6 is substantially a flat surface, while the rear portion thereof in cross section has generally the contour of a parabola. The parabolic surface of this tube section is mirrored or covered with a reflecting medium 12, for example, an aluminum layer which has been sputtered on to the mentioned surface of the glass. It will be understood that any other reflecting layer may be employed, for example, the surface may be silvered but such a silver surface is less durable and is therefore not to be preferred. The capillary bore 13 of the tube section 6 is located at or near the focus of the parabola defining the rear surface of the tube. It will be appreciated that when the indicating medium rises in the bore 13 of the tube section 6, the width of the indicating column will be magnified so that it appears to be coextensive in width with the width of the face 10 of the indicating tube section, as represented by the heavy shading.

Figure 3:
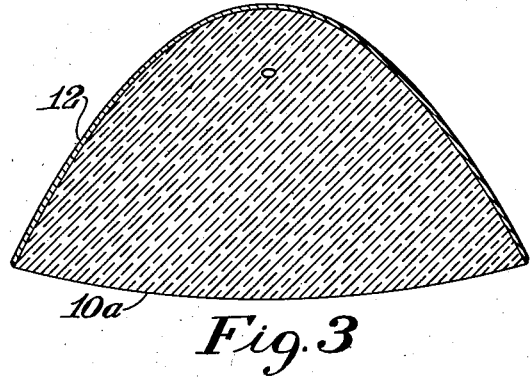

Instead of having the reading face 10 of the indicating tube section defined by a plane surface, it may be slightly curved as indicated at 10a in Fig. 3.

I claim:

1. A glass thermometer including a bulb containing a thermosensitive liquid, a capillary tube connected to said bulb and having a bore therein communicating with said bulb, said tube having a flattened reading surface and a parabolic mirrored surface symmetrically positioned with respect to said flattened surface with the focus of said parabolic surface substantially coinciding with said bore.

2. A glass thermometer including a bulb containing a thermosensitive liquid, an indicating capillary tube connected to said bulb and having a bore therein communicating with said bulb, said tube having a parabolic rear surface and a flattened reading surface, said bore being located at approximately the focus of said parabolic surface, and reflecting material on a substantial portion of said parabolic surface.

3. A glass thermometer including a bulb containing a thermosensitive liquid, an indicating capillary tube connected to said bulb and having a bore therein communicating with said bulb, the cross section of said tube being defined by a parabola and a chord of said parabola, said chord being substantially perpendicular to the axis of said parabola, said bore being located at approximately the focus of said parabola, and reflecting material on a substantial portion of the parabolic surface of said tube.

BRADFORD NOYES, JR.